3,346,582
1-OXYACYL-BENZ[a]CYCLOPENT-
[f]QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed July 21, 1965, Ser. No. 473,811
3 Claims. (Cl. 260—287)

This invention relates to novel 1-substituted quinolizines and more particularly, this invention relates to novel 1-substituted quinolizines of the formula:

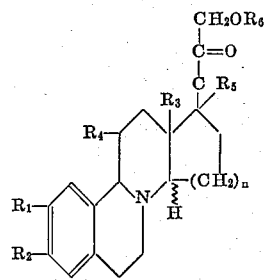

wherein $R_1$ and $R_2$ may be hydrogen, hydroxy, lower alkoxy of 1 to 6 carbon atoms such as methoxy, ethoxy, propoxy, isopropoxy and the like or $R_1$ and $R_2$ taken together form a methylene dioxy group; $R_3$ may be hydrogen or lower alkyl of 1 to 6 carbon atoms such as methyl, ethyl, propyl, isopropyl and the like; $R_4$ may be hydrogen, hydroxy or lower acyloxy of 1 to 6 carbon atoms such as acetoxy and formyloxy; $R_5$ may be hydrogen, hydroxy or lower acyloxy of 1 to 6 carbon atoms such as acetoxy and formyloxy; $R_6$ may be hydrogen or an acyl radical such as acetyl, benzoyl, toluyl and the like and $n$ is an integer of 1 or 2.

The numbering of the compounds of this invention when $n$ is 2 is as follows:

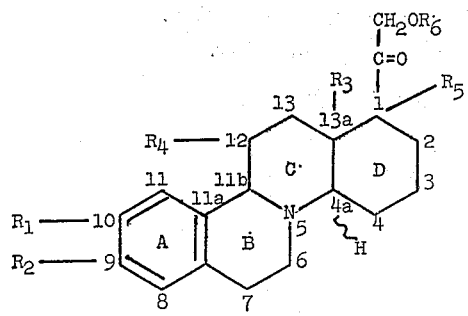

and when $n$ is 1 the numbering is as follows:

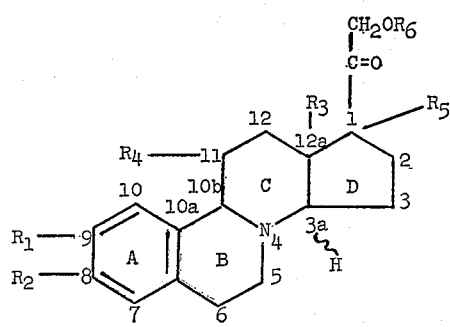

The compounds of this invention have steriodal-like activities and are useful in endocrine therapy. They also exhibit significant pharmacological activity on the cardiovascular system. In use, they may be combined with a nontoxic pharmaceutical carrier to form dosage forms such as tablets, capsules, solutions, suspensions, elixirs, suppositories and the like, the active ingredient being present from 1 to 500 mg. per dosage unit. They may also be combined with other therapeutic agents such as analgesics, for example, aspirin, codeine or namol xenyrate; antibiotics, for example, the tetracyclines or colimycin; cardiovascular agents, for example, PETN; anti-inflammatory agents, for example, β-methasone-17-valerate or prednisolone, or other steroids, for example, estrogen or progesterone to enhance and broaden their therapeutic spectrum.

In addition, the compounds of this invention are useful as intermediates for the production of the other novel substituted quinolizines and will undergo further reaction and transformation such as the Birch reduction, for example, to give compounds of the formula:

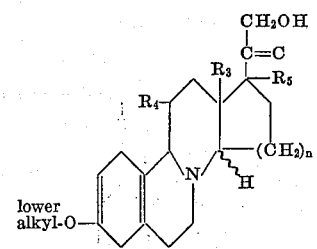

III

According to this invention the above compounds are prepared by treating quinolizine bases of the formula:

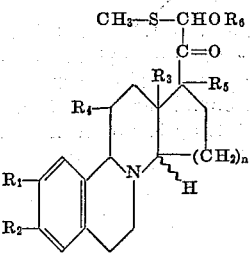

II with a suitable desulfurizing reagent. These desulfurizing reagents include, for example, Raney nickel and Raney cobalt. The reaction is effected in a solvent system such as a low molecular weight alcohol, for example, ethanol. A temperature range of from 0° C. to the boiling point of the solvent is suitable, preferably at ambient temperature. The desired reaction product may be recovered by removing the catalyst and the solvent used in the reaction. The starting materials used in the above described reaction are prepared according to the procedures set forth in our copending application, "1-Methylthioacyl-Benz[a] Cyclopenta[f]Quinolizines and Process for Their Production," Ser. No. 473,840, filed July 21, 1965, now U.S. Patent 3,267,105. The primary product obtained as a result of the above-described desulfurization reaction is a compound in which $R_6$ is acyl and the preparation of the free alcohol may be readily accomplished by standard procedures for effecting hydrolysis.

The follownig examples are included in order further to illustrate the invention.

*Example 1.* — *1,2,3,3a,5,6,10b,11,12,12a - decahydro - 8 - methoxy - 12 - methyl - 1 - acetoxyacetyl-benz[α]cyclopent[f]quinolizine*

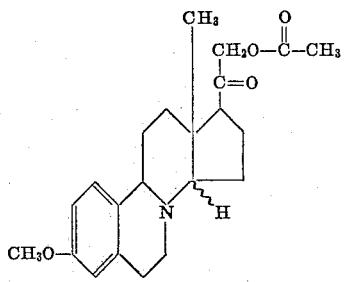

A solution of 1.0 g. of 1,2,3,3a,5,6,10b,11,12,12a-decahydro-8-methoxy - 12a - methyl-1-[acetoxy(methylthio)-acetyl]benz[a]cyclopenta[f]quinolizine in 50 ml. of ethanol containing about 10 grams of Raney Ni is refluxed for 6 hours. The catalyst is filtered, washed well with ethanol and the solvent is removed by distillation. The residue is triturated with acetonitrile to induce crystallization. The slurry is cooled and filtered to give 1,2,3,3a,5,6,10b,11,12,12a-decahydro - 8 - methoxy - 12a - methyl-1-acetoxyacetyl-benz[a]cyclopent[f]quinolizine as white needles, M.P. 164°–165° C. after recrystallization from acetonitrile.

*Example 2.* — *1,2,3,3a,5,6,10b,11,12,12a - decahydro - 8 - methoxy-12a-methyl - 1 - acetoxyacetyl-1,11-dihydroxy-benz[a]cyclopent[f]quinolizine*

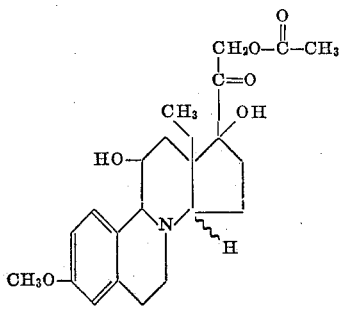

A solution of 0.8 g. of 1,2,3,3a,5,6,10b,11,12,12a-decahydro-8-methoxy - 12a - methyl-1-[acetoxy(methylthio)-acetyl]-1,11-dihydroxy-benz[α]cyclopent[f]quinolizine in 50 ml. of ethanol containing about 5 g. of Raney Ni is stirred at ambient temperature such as 20° to 30° C. for a period of 65 hours. The reaction mixture is then processed according to Example 1 to give 1,2,3,3a,5,6, 10b,11,12,12a - decahydro - 8 - methoxy - 12a - methyl-1-acetoxyacetyl - 1,11 - dihydroxy - benz[a]cyclopent[f]-quinolizine as white crystals, M.P. 191°–193° C. after recrystallization from ethyl acetate.

It is understood that the foregoing detailed description is given merely by way of illustration and that many variations may be made therein without departing from the spirit of our invention.

Having described our invention, what we desire to secure by Letters Patent is:

1. A compound of the formula:

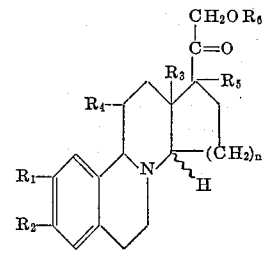

wherein $R_1$ and $R_2$ are each a member of the group consisting of hydrogen, hydroxy and lower alkoxy and $R_1$ and $R_2$ taken together form a methylene dioxy group; $R_3$ is a member selected from the group consisting of hydrogen and lower alkyl; $R_4$ is a member selected from the group consisting of hydrogen and hydroxy; $R_5$ is a member of the group consisting of hydrogen and hydroxy; $R_6$ is a member selected from the group consisting of hydrogen and acyl of a carboxylic acid and $n$ is an integer of from 1 to 2.

2. 1,2,3,3a,5,6,10b,11,12,12a - decahydro - 8 - methoxy-12a-methyl - 1 - acetoxyacetyl-benz[a]cyclopent[f]quinolizine.

3. 1,2,3,3a,5,6,10b,11,12,12a - decahydro - 8 - methoxy-12a-methyl - 1 - acetoxyacetyl - 1,11 - dihydroxy-benz[a]cyclopent[f]quinolizine.

References Cited

UNITED STATES PATENTS 3,222,367    12/1965    Brown et al. _____ 260—289

ALEX MAZEL, *Primary Examiner.*

D. DAUS, *Assistant Examiner.*